(No Model.)
G. T. SONGER.
GATE LATCH.
No. 442,646. Patented Dec. 16, 1890.
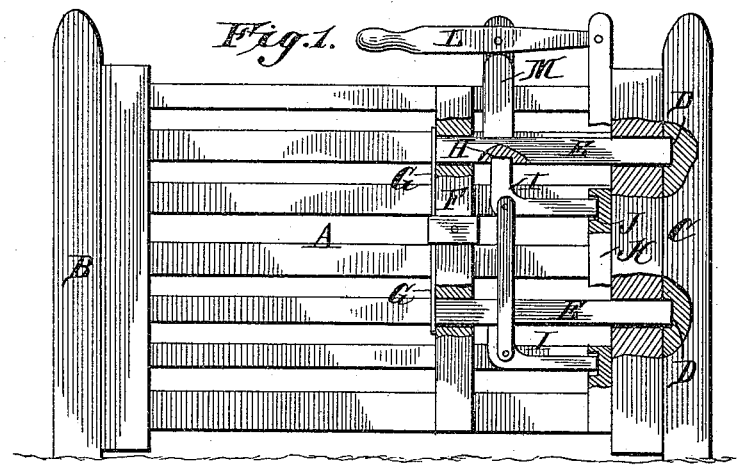
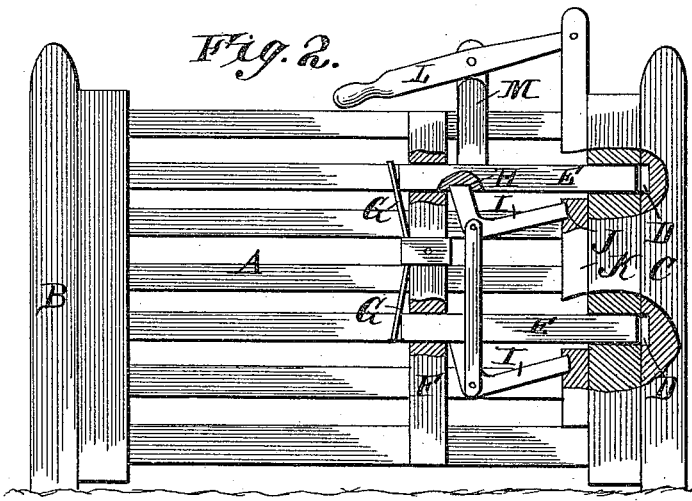
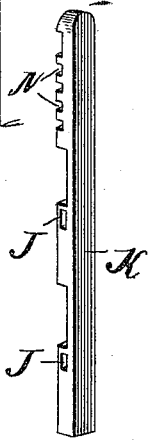
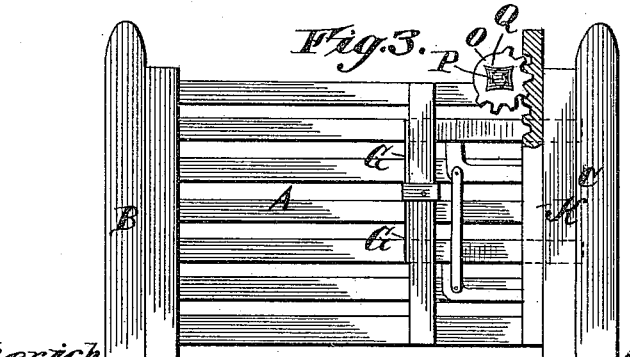
Witnesses
H. G. Dieterich
R. W. Dayton
Inventor
Gordon T. Songer
By his Attorneys,
C. A. Snow & Co.

UNITED STATES PATENT OFFICE.

GORDON T. SONGER, OF ELIZABETHTON, TENNESSEE.

GATE-LATCH.

SPECIFICATION forming part of Letters Patent No. 442,646, dated December 16, 1890.

Application filed August 5, 1890. Serial No. 361,062. (No model.)

*To all whom it may concern:*

Be it known that I, GORDON T. SONGER, a citizen of the United States, residing at Elizabethton, in the county of Carter and State of Tennessee, have invented a new and useful Gate-Latch, of which the following is a specification.

My invention relates to improvements in gate-latches; and it consists in certain novel features hereinafter described and claimed.

In the accompanying drawings, Figure 1 is a side elevation of a gate provided with my improved latch, the gate being shown locked and with parts broken away. Fig. 2 is a similar view showing the gate unlocked. Fig. 3 is a view of a modification. Fig. 4 is a detail view of the vertically-movable bar.

The gate A is of the usual construction, and is supported on the hinge-post B in any desired manner. The latch-post C is provided in its inner side with recesses D, and on the gate I mount the horizontal sliding bolts E, which are adapted to engage the said recesses. The bolts slide through suitable openings in the end bar of the gate, and their rear ends are guided by a supporting-bar F, secured to the rails of the gate. A leaf-spring G is secured to the inner side of this supporting-bar between the bolts, and its ends bear on the rear ends of the bolts, so as to project them normally into engagement with the recesses D. The bolts are provided in their under sides near their rear ends with recesses or sockets H, which are engaged by the upper ends of the angle-levers I, which are fulcrumed on the rails of the gate and have their outer ends engaging recesses or sockets J in a vertically-disposed bar K at the front end of the gate, which is reciprocated vertically by an operating-lever L, fulcrumed on a standard M, projecting from the upper rail of the gate.

In practice the bolts are normally projected into engagement with the recesses in the latch-post by the spring G, as shown and as will be readily understood. When it is desired to open the gate, the operating-lever is vibrated, so as to raise the reciprocating bar K, thereby causing the levers I to swing on their pivots, so as to slide the bolts backward. The bolts will thus be disengaged from the latch-post and the gate permitted to swing open.

It will be observed from the foregoing description that I have provided a gate-latch which is simple in its construction and which is composed of few parts compactly arranged. The latch is easily operated and will effectually prevent sagging or twisting of the gate, as it employs two bolts, one near the top and bottom, respectively, of the gate, as shown.

When the latch is applied to a large gate, the reciprocating bar is operated by the lever L, as above described; but when applied to a small gate the said bar is preferably operated by means of the devices shown in Fig. 3. The reciprocating bar is provided with a series of rack-teeth N on its inner or rear side, and these rack-teeth are engaged by a segmental gear O on a rock-shaft P, which is mounted on the upper rail of the gate and provided with suitable handles Q at its ends. This device will operate in the same manner as that shown in the other figures, but will be more desirable on a small gate, as it requires less room.

Having described my invention, what I claim, and desire to secure by Letters Patent, is—

The combination of the sliding bolts, the spring bearing thereon, the angle-levers connected to the bolts, the vertically-reciprocating bar connected to the angle-levers, and mechanism for operating said bar, as set forth.

In testimony that I claim the foregoing as my own I have hereto affixed my signature in presence of two witnesses.

GORDON T. SONGER.

Witnesses:
JAMES D. JENKINS,
DAVID STORER JENKINS.